(12) United States Patent
Aleidan et al.

(10) Patent No.: US 12,225,041 B2
(45) Date of Patent: Feb. 11, 2025

(54) SYSTEM AND METHOD FOR CENTRALIZED CYBERSECURITY CONFIGURATION COMPLIANCE MANAGEMENT

(71) Applicant: SAUDI ARABIAN OIL COMPANY, Dhahran (SA)

(72) Inventors: Eidan K. Aleidan, Dhahran (SA); Ziad I. Alomair, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 225 days.

(21) Appl. No.: 17/932,060

(22) Filed: Sep. 14, 2022

(65) Prior Publication Data
US 2024/0089283 A1 Mar. 14, 2024

(51) Int. Cl.
*H04L 9/40* (2022.01)
(52) U.S. Cl.
CPC ................ *H04L 63/1433* (2013.01)
(58) Field of Classification Search
CPC .... G06F 21/577; H04L 63/1433; H04L 63/20
See application file for complete search history.

(56) References Cited

U.S. PATENT DOCUMENTS

| | | |
|---|---|---|
| 8,990,937 B2 | 3/2015 | Durie |
| 10,097,585 B2 | 10/2018 | Bush et al. |
| 10,523,709 B2 | 12/2019 | Bower |
| 2020/0119983 A1* | 4/2020 | D'Onofrio .......... H04L 41/0893 |
| 2024/0028009 A1* | 1/2024 | Mirth ................. H04L 63/1433 |

* cited by examiner

*Primary Examiner* — Kevin Bechtel
(74) *Attorney, Agent, or Firm* — Vorys, Sater, Seymour and Pease, LLP

(57) ABSTRACT

A system and method for centralized cybersecurity configuration compliance management for an enterprise having one or more assets operate to collect external inputs including one or more of open source cybersecurity configuration baselines (OSCSCBs), vendor hardening documentation (VHD), and information from exploitation and vulnerability public databases, collect internal inputs including cybersecurity standards of the enterprise and guidelines that are specific to the assets of the enterprise, consolidate the collected external and internal inputs, and apply supervised decision tree machine learning (ML) model to generate cybersecurity configuration baseline (CSCB) controls mapping to the assets in the enterprise.

15 Claims, 4 Drawing Sheets

SYSTEM AND METHOD FOR CENTRALIZED CYBERSECURITY CONFIGURATION COMPLIANCE MANAGEMENT

FIELD OF THE DISCLOSURE

The present disclosure relates generally to cybersecurity configuration hardening, and more particularly, to the provision of relevant and up-to-date cybersecurity configuration baseline (CSCB).

BACKGROUND OF THE DISCLOSURE

Systems hardening is applied to IT (information technology) ecosystems to reduce vulnerability to attack in technology applications, systems, infrastructure, firmware, and other areas. Systems hardening uses a collection of tools, techniques, and best practices to reduce vulnerability. It aims to reduce security risks by eliminating potential attack vectors and condensing the systems' attack surfaces. By removing superfluous programs, accounts functions, applications, ports, permissions, access, etc. attackers and malware have fewer opportunities to gain a foothold within an IT ecosystem.

Cybersecurity configuration (CSC) is an integral part of the system hardening process. CSC provides the minimum cybersecurity requirements to ensure that the system is protected from breaches. CSC defines a clear set of requirements for enterprises to ensure that all their IT systems are complying with minimum cybersecurity requirements per system type. CSC requirements can include controls to reduce or mitigate the risk to systems and assets. They include any type of policy, procedure, technique, method, solution, plan, action, or device designed to help protect the systems and assets. The diversity within the IT landscape calls for a specific set of CSC to be required per system type and commonly referred to as CSC baseline (CSCB).

The cybersecurity community has generated many open-source CSCB for a wide variety of systems that are available for public use. However, they are general and each enterprise has to customize those best practices to meet their internal or specific IT infrastructure. Nonetheless, the best practices remain a main source for internal organization-specific CSCB.

Consequently, many companies and enterprises develop their own CSCB that might be adopted from cybersecurity community recommendations or vendor guidelines and customized for the particular system and asset. Those CSCB are developed and approved by stakeholders from for example cybersecurity organizations or system owners in the enterprise. Additionally, companies and enterprises create high level standards to govern the cybersecurity general policies that are non-system specific, and that should be implemented on all systems and technologies such as password complexity. Customization of CSCB needs to be consistent with such high-level standards and policies.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a system and method for centralized cybersecurity configuration compliance management for an enterprise having one or more assets operate to collect external inputs including one or more of open source cybersecurity configuration baselines (OSCSCBs), vendor hardening documentation (VHD), and information from exploitation and vulnerability public databases, collect internal inputs including cybersecurity standards of the enterprise and guidelines that are specific to the assets of the enterprise, consolidate the collected external and internal inputs, and apply supervised decision tree machine learning (ML) model to generate cybersecurity configuration baseline (CSCB) controls mapping to the assets in the enterprise.

In certain embodiments, the ML model is used to identify the criticality of each asset in the network, check history of vulnerabilities, and identify relevant controls from external and internal sources.

In certain embodiments, the mapping is based on severity and criticality in the network.

In certain embodiments, the OSCSCBs are obtained from one or more of the Center of Information Security (CIS) Benchmarks or the US Department of Defense Security Technical Implementation Guides (STIGs).

In certain embodiments, the mapping identifies one or more of:
Open Source Cybersecurity Configuration Baseline
Vendor Hardening Documentation
High Level Cybersecurity Standards
System-Specific Guidelines In certain embodiments, a centralized cybersecurity standards manager is operable to maintain an inventory of all different types of assets in the enterprise that require a CSCB.

In certain embodiments, the centralized cybersecurity standards manager is further operable to identity relevant standards for every asset type in the enterprise.

In certain embodiments, the centralized cybersecurity standards manager is further operable to monitor changes that occur to any external or internal standard.

In certain embodiments, the centralized cybersecurity standards manager is further operable to identify and update CSCB impacted by said changes.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
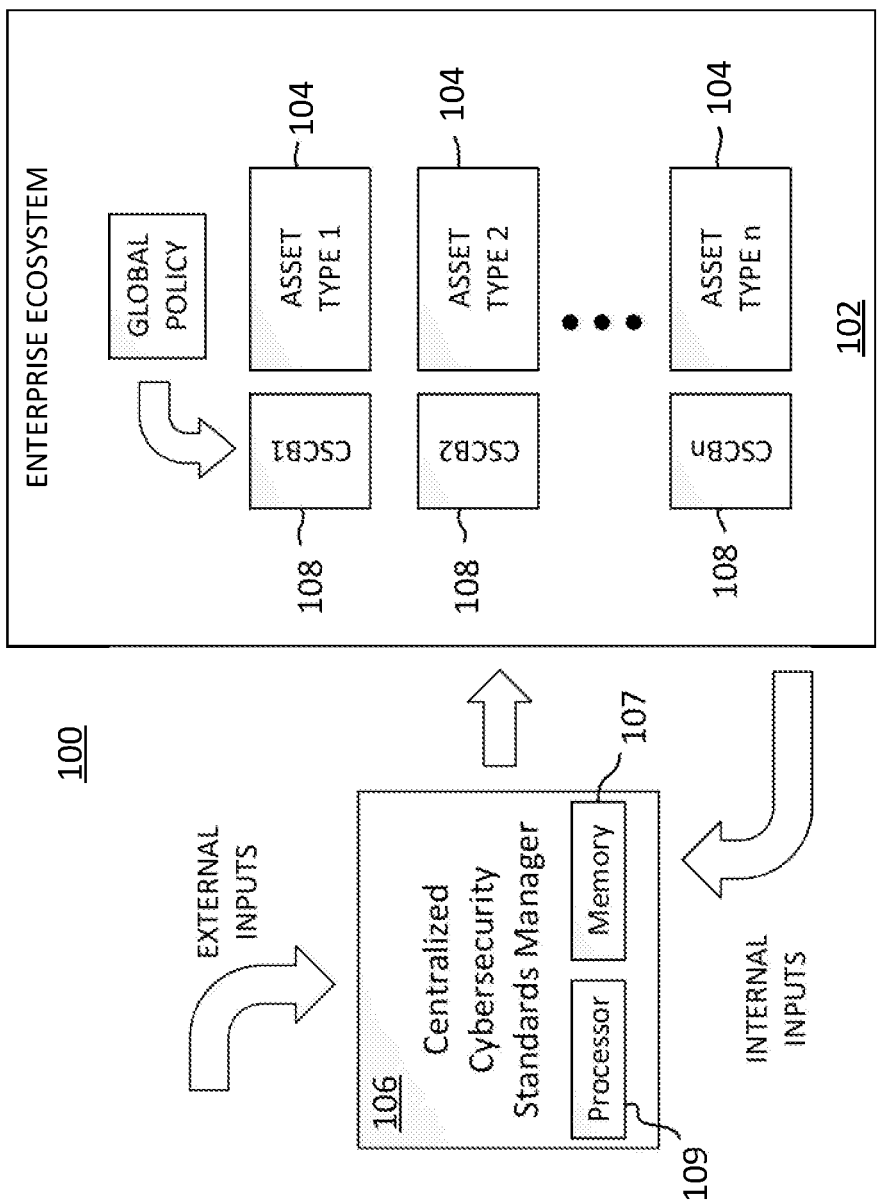
FIG. 1 is a block diagram showing an overview of a system for centralized cybersecurity configuration compliance management for an enterprise or IT ecosystem in accordance with certain embodiments.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to cybersecurity configuration hardening, and more particularly, to the provision of relevant and up-to-date cybersecurity configuration baseline (CSCB) that attach to specific types of assets and systems in an IT enterprise.

To define cybersecurity requirements, companies establish high level policies and standards that govern their cybersecurity state. The CSCB is a low-level technical prescription for cybersecurity configurations of specific systems or assets of the enterprise. The CSCB is usually adopted from external sources, such as international standards or vendor documentation.

In certain embodiments, a system and method for dynamically integrating enterprise standards and policies with CSCB to ensure that every high-level policy update of the enterprise triggers concomitant CSCB updates to achieve highest level of adherence to organization policies in a timely manner is described.

FIG. 1 is a block diagram showing an overview of a system 100 for centralized cybersecurity configuration compliance management for an enterprise or IT ecosystem in accordance with certain embodiments. An enterprise or IT ecosystem 102 (sometimes referred to as network) is shown as comprising one or more types of assets or systems 104 (the terms "asset" and "system" may be used interchangeably herein) whose protection and compliance is sought. A centralized cybersecurity standards manager 106, which may be part of the enterprise IT ecosystem 102, is generally configured to link and align industry cybersecurity standards (CSC) received as external inputs with those of the enterprise 102 received as internal inputs and cross-match them with one another and align them with enterprise global policy. This alignment generates system-specific controls that are tagged with the relevant standards, policy and external baseline. Once all controls are cross-referenced, the system generates a full CSCB 108 for each system or asset within the IT infrastructure 102. If any of relevant standard, policy and external baseline is changed, the system provides a systematic approach to update all relevant CSCBs 108. In certain embodiments, the system also operates to dynamically update the systems to ensure timely policy compliance and to identify missing technical CSCB controls.

Figure 2:
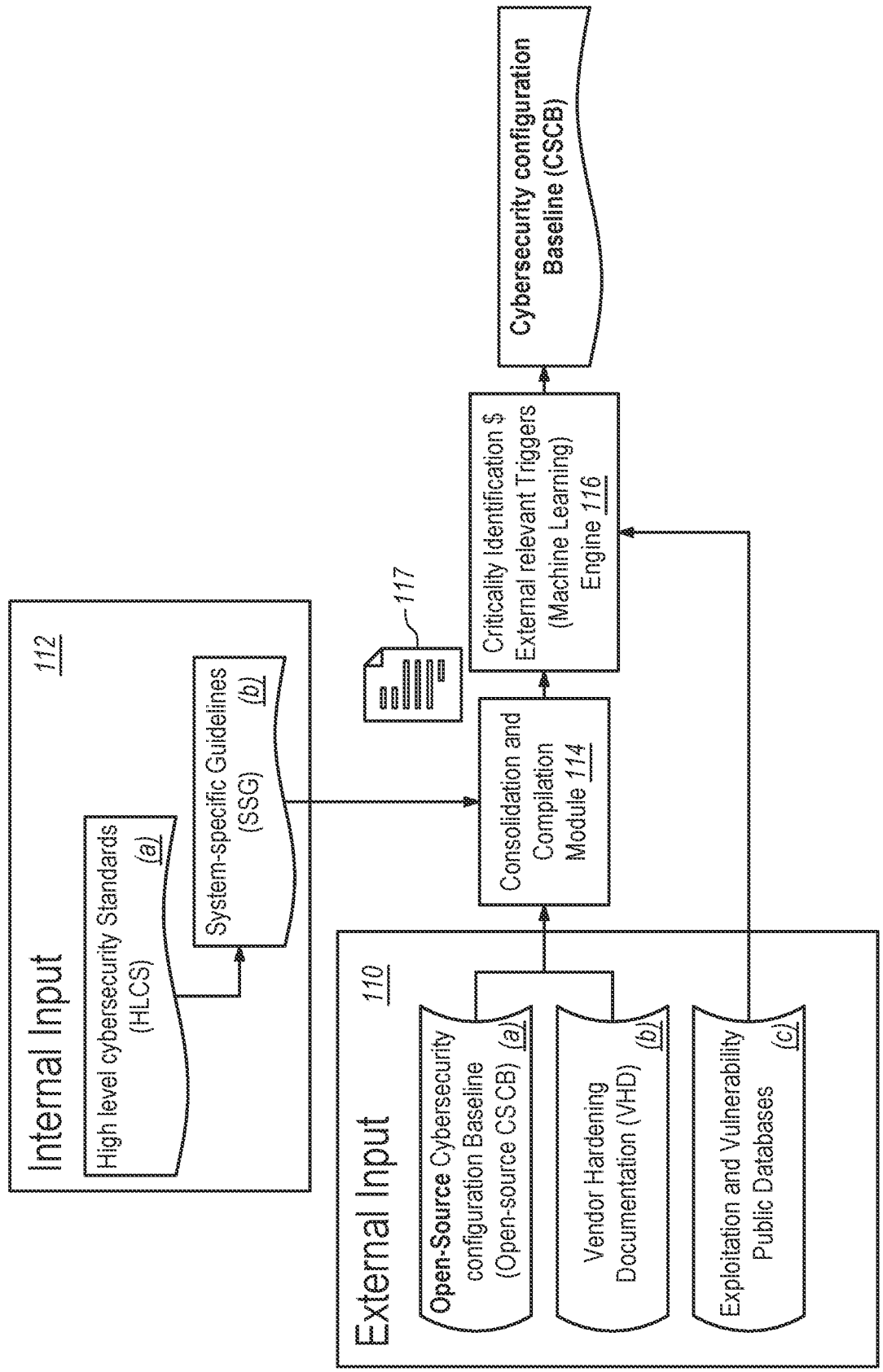
FIG. 2 is a block diagram showing generally the operational flow of the centralized cybersecurity standards manager in linking and aligning cybersecurity standards with cybersecurity standards and policies of the enterprise and cross-matching them with external best practices.

FIG. 2 is a block diagram showing generally the operational flow of the centralized cybersecurity standards manager 106 in linking and aligning cybersecurity standards with cybersecurity standards and policies of the enterprise 102 and cross-matching them with external best practices. Outputs of this operation are the CSCB 108, dynamically generated and customized to the systems and assets 104 in the context of the current security environment.

As seen in FIG. 2, external inputs 110 and internal inputs 112 are provided to a consolidation and compilation module 114, which may be a software or a hardware component, or a combination of both, and may include an application, program, or agent or the like that are stored in memory 107 (FIG. 1) and executed by a processor 109 of centralized cybersecurity standards manager 106.

External inputs 110 include open source cybersecurity configuration baselines (OSCSCBs) 110a, which are generally the first input to the process. As most major systems contain international best practices of securing configurations of systems and applications, these need to be taken as input to ensure:
  Identification of security configuration controls for a given system
  Alignment with international standards
Important (but not exclusive) sources of open source CSCB 110a are:
  Center of Information Security (CIS) Benchmarks
  U.S. Department of Defense Security Technical Implementation Guides (STIGs)

As appreciated, an externally-retrieved open-source CSCB 110a for a system or asset at large may not be applicable to the specific type of system or asset 104 operated by the enterprise 102. This may be due to the different nature of the environment of each organization or enterprise, for instance, or for or for a host of other reasons. However, this difference is resolved by the retrieval of the internal inputs 112, which, as detailed below, provide system specific guidelines, in addition to high level cybersecurity standards, that enable the required customization.

Another external input to consolidation and compilation module 114 is the vendor hardening documentation (VHD) 110b for the security configuration for the subject systems and assets 104. The vendor hardening documentation ensures the following benefits:
  Enhance the security configurations of the systems 104
  Provide rapid updates to the CSCBs as the vendor documentation is updated more frequently compared to open source CSCB
  Ensure coverage for systems with no open source CSCB
  Align with vendor guidelines A third external input to consolidation and compilation module 114 is external public databases 110c. Exploitation and vulnerability public databases are also utilized in certain embodiments to provide an up-to-date feed to a supervised decision tree machine learning model in a machine learning engine 116, described below. The feed provides any new exploitation or vulnerabilities that could be exploited by deviation from the cybersecurity configuration baseline. This provides context of the vulnerability and configuration deviation to the systems 104 when a baseline is applied.

Internal inputs 112 to consolidation and compilation module 114 include high-level organization standards for cybersecurity 112a. Those standards are the basis of CSCB as they are cross-referenced with external inputs received above to extract required security configuration controls. The high-level cybersecurity standards 112*a* are high-level directives (HLCS) that may not include specific technical languages or details for effected systems or assets 104.

Internal inputs 112 to consolidation and compilation module 114 also include system-specific guidelines (SSG) 112*b*, technical documents and specifications that are particular to each technology or system type 104 and include specific technical parameters. In certain embodiments, those parameters cascade from the high-level directives HLCS 112*a*.

The external (110) and internal (112) inputs are provided to consolidation and compilation module 114 for performing controls consolidation. Consolidation and compilation module 114 may be a software or a hardware component, or a combination of both, and may include an application, program, or agent or the like that are stored in memory 107 (FIG. 1) and executed by a processor 109 of centralized cybersecurity standards manager 106. A mapping reference 117 is generated to link the relevant controls from all the sources and to provide a holistic mapping of the control and its supporting documents. For instance, a single control will be pointing back to:

Open Source Cybersecurity Configuration Baseline
Vendor Hardening Documentation
High Level Cybersecurity Standards
System-Specific Guidelines The module 114 outputs an initial CSCB that details a list of controls and systems that are automatically mapped to assets or systems 104 in the IT ecosystem 102 based on the external (110) and internal (112) inputs. In certain embodiments, this output of consolidation and compilation module 114 can serve as a CSCB 108 on its own.

To enhance the controls assigned to each asset 104, a machine learning engine 116 is used, whereby a supervised decision tree machine learning (ML) model is utilized to identify the criticality of each system in the network, check history of vulnerabilities, and identify relevant controls from external and internal sources. The final product will have controls mapped to each asset 104 in the network 102 based on severity and criticality in the IT network. As a result, the CSCB will be a dynamic document as opposed to a static document that will be updated based on changes of assets' security status or the release of new controls and policies. For instance, two identical systems 104 might have different CSCB because those systems have different criticality or different security contexts. The ML is used to facilitate this distinction. One objective is to have a CSCB that is more linked and customized to the current security environment of enterprise or IT ecosystem 102, rather than one size fits all. Any new updates to the CSCB will be communicated immediately to the system owner and the cybersecurity organization in the network for review, implementation and compliance.

Utilizing machine learning engine 116 provides instant reflection of new controls or updates to related policies that could affect any CS CB within the organization, permitting real-time highly relevant updates that are critical to maintaining security and thwarting attacks, and taking a comprehensive approach to confirm the relevant CSCBs are updated and current. Importantly, this eliminates the human limitations of manual checks and verifications from different external and internal resources in order to ensure all are up to date, and evaluating the criticality and improving identification of applicable controls in a very timely manner.

Figure 3:
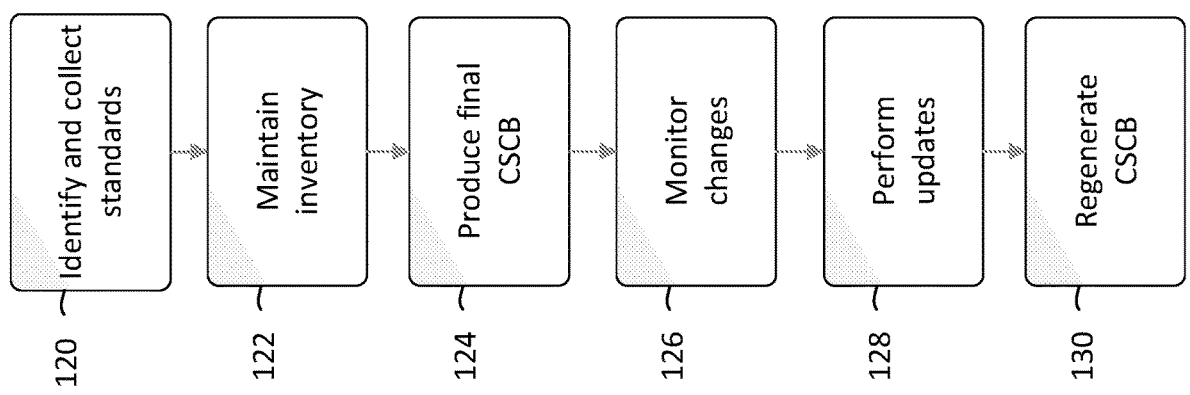
FIG. 3 is a flow diagram showing some processes that are performed by the system 100 for centralized cybersecurity configuration compliance management in accordance with certain embodiments.

FIG. 3 is a flow diagram showing some processes that are performed by the system 100 for centralized cybersecurity configuration compliance management in accordance with certain embodiments. As noted above, any of the components of the system 100, including those of centralized cybersecurity standards manager 106, may be a software or a hardware component, or a combination of both, and may include an application, program, or agent or the like for performing these processes.

At 120, internal and external cybersecurity standards are collected, via inputs 110 and 112 as described above for example. At 122, the system operates to maintain an inventory of all different types of systems that require a CSCB in the enterprise or IT ecosystem 102. At 124, relevant standards for every system type 104 are identified. At 124 final full CSCB 108 are produced for every system type 104. At 126, changes that occur to any standard, internal or external, are monitored. At 128, CSCB 108 impacted by such changes are identified, and at 130, impacted CSCB are updated.

While, for purposes of simplicity of explanation, the example process of FIG. 3 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While, for purposes of simplicity of explanation, the example processes of FIG. 3 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 4. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 4:
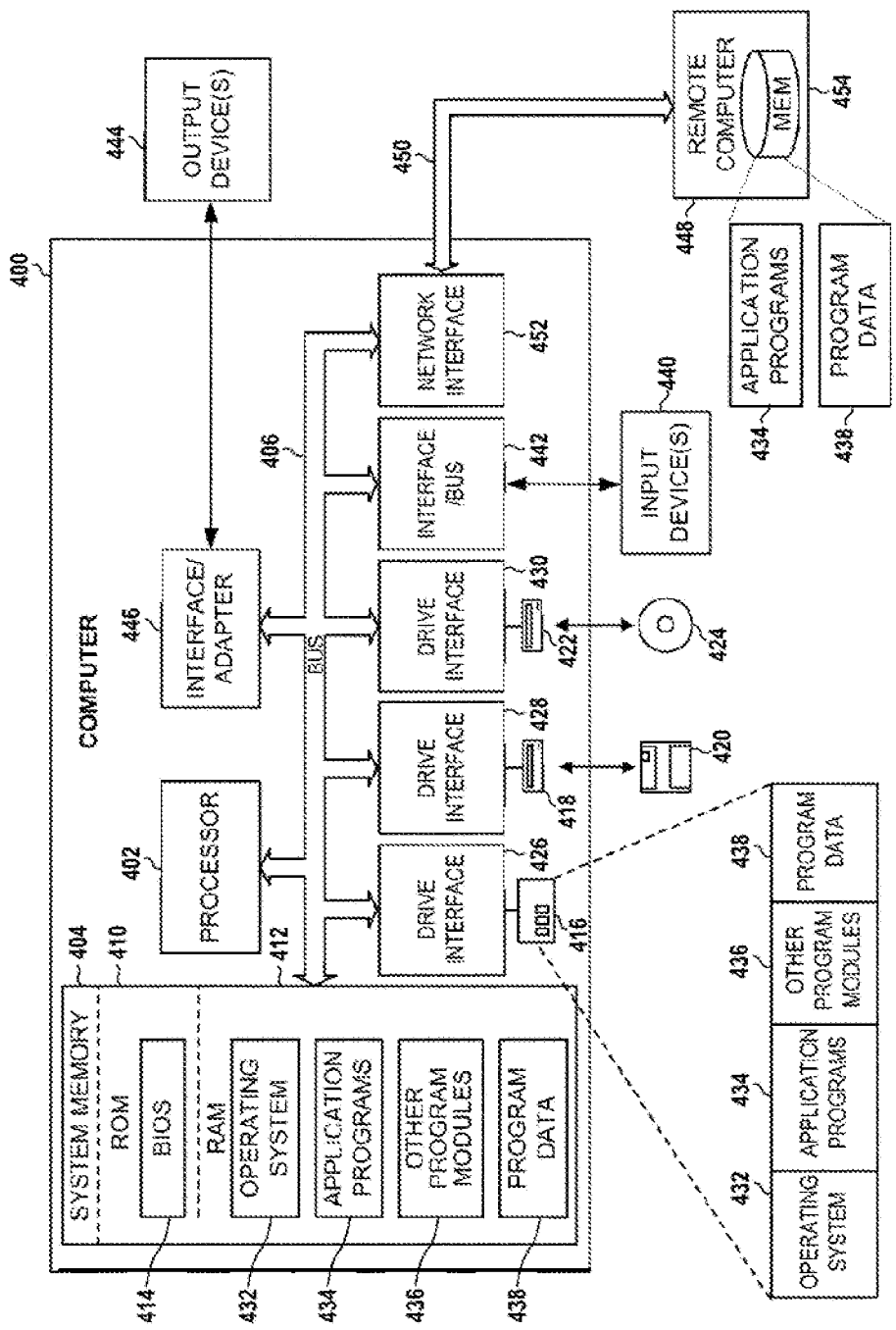
FIG. 4 is a block diagram of one example of a computer system that can be employed to execute one or more embodiments of the present disclosure.

In this regard, FIG. 4 illustrates one example of a computer system 400 that can be employed to execute one or more embodiments of the present disclosure. Computer system 400 can be implemented on one or more general purpose networked computer systems, embedded computer systems, routers, switches, server devices, client devices, various intermediate devices/nodes or standalone computer systems. Additionally, computer system 400 can be implemented on various mobile clients such as, for example, a personal digital assistant (PDA), laptop computer, pager, and the like, provided it includes sufficient processing capabilities.

Computer system 400 includes processing unit 402, system memory 404, and system bus 406 that couples various system components, including the system memory 404, to processing unit 402. Dual microprocessors and other multiprocessor architectures also can be used as processing unit 402. System bus 406 may be any of several types of bus structure including a memory bus or memory controller, a peripheral bus, and a local bus using any of a variety of bus architectures. System memory 404 includes read only memory (ROM) 410 and random access memory (RAM) 412. A basic input/output system (BIOS) 414 can reside in ROM 410 containing the basic routines that help to transfer information among elements within computer system 400.

Computer system 400 can include a hard disk drive 416, magnetic disk drive 418, e.g., to read from or write to removable disk 420, and an optical disk drive 422, e.g., for reading CD-ROM disk 424 or to read from or write to other optical media. Hard disk drive 416, magnetic disk drive 418, and optical disk drive 422 are connected to system bus 406 by a hard disk drive interface 426, a magnetic disk drive interface 428, and an optical drive interface 430, respectively. The drives and associated computer-readable media provide nonvolatile storage of data, data structures, and computer-executable instructions for computer system 400. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 410, including operating system 432, one or more application programs 434, other program modules 436, and program data 438. In some examples, the application programs 434 can include consolidation and compilation module 114 and machine learning engine 116, and the program data 438 can include CSBC 108 and mapping reference 117. The application programs 434 and program data 438 can include functions and methods programmed to perform the centralized cybersecurity configuration compliance management such as shown and described herein.

A user may enter commands and information into computer system 400 through one or more input devices 440, such as a pointing device (e.g., a mouse, touch screen), keyboard, microphone, joystick, game pad, scanner, and the like. These and other input devices 440 are often connected to processing unit 402 through a corresponding port interface 442 that is coupled to the system bus, but may be connected by other interfaces, such as a parallel port, serial port, or universal serial bus (USB). One or more output devices 444 (e.g., display, a monitor, printer, projector, or other type of displaying device) is also connected to system bus 406 via interface 446, such as a video adapter.

Computer system 400 may operate in a networked environment using logical connections to one or more remote computers, such as remote computer 448. Remote computer 448 may be a workstation, computer system, router, peer device, or other common network node, and typically includes many or all the elements described relative to computer system 400. The logical connections, schematically indicated at 450, can include a local area network (LAN) and a wide area network (WAN). When used in a LAN networking environment, computer system 400 can be connected to the local network through a network interface or adapter 452. When used in a WAN networking environment, computer system 400 can include a modem, or can be connected to a communications server on the LAN. The modem, which may be internal or external, can be connected to system bus 406 via an appropriate port interface. In a networked environment, application programs 434 or program data 438 depicted relative to computer system 300, or portions thereof, may be stored in a remote memory storage device 454.

The invention claimed is:

1. A method for centralized cybersecurity configuration compliance management for an enterprise having one or more assets, comprising:
   collecting external inputs including open source cybersecurity configuration baselines (OSCSCBs), vendor hardening documentation (VHD), and information from exploitation and vulnerability public databases;
   collecting internal inputs including cybersecurity standards of the enterprise and guidelines that are specific to the one or more assets of the enterprise;
   monitoring, in real-time, changes that occur to the OSCSCBs, the VHDs, the information from the exploitation and vulnerability public databases, the cybersecurity standards of the enterprise, and the guidelines that are specific to the one or more assets of the enterprise;
   identifying the collected external and internal inputs impacted by the changes;
   updating, in real-time and based on the changes, the collected external and internal inputs;
   consolidating the collected external and internal inputs into an up-to-date feed; and
   applying, into an up-to-date feed, a supervised decision tree machine learning (ML) model to generate a mapping of cybersecurity configuration baseline (CSCB) controls to the one or more assets in the enterprise.

2. The method of claim 1, further comprising:
   identifying relevant standards for each of different asset types in the enterprise.

3. The method of claim 1, wherein the ML model identifies a criticality of each of the one or more assets, checks a history of vulnerabilities, and identifies relevant controls from external and internal sources.

4. The method of claim 1, wherein the OSCSCBs are obtained from one or more of the Center of Information Security (CIS) Benchmarks or the US Department of Defense Security Technical Implementation Guides (STIGs).

5. The method of claim 1, wherein the mapping identifies one or more of:
   an open source cybersecurity configuration baseline;
   vendor hardening documentation;
   high-level cybersecurity standards; and
   system-specific guidelines.

6. The method of claim 1, wherein the centralized cybersecurity standards manager is further operable to maintain an inventory of different asset types in the enterprise that require a CSCB.

7. The method of claim 6, wherein the centralized cybersecurity standards manager is further operable to identity relevant standards for each of the different asset types in the enterprise.

8. The method of claim 1, wherein the mapping is based on a severity and a criticality in a network associated with the one or more assets.

9. A system for centralized cybersecurity configuration compliance management for an enterprise having one or more assets, comprising:
   a memory; and
   a processor configured to execute instructions stored in the memory to implement a centralized cybersecurity standards manager, the centralized cybersecurity standards manager configured to cause the processors to:
     collect external inputs including open source cybersecurity configuration baselines (OSCSCBs), vendor hardening documentation (VHD), and information from exploitation and vulnerability public databases,
     collect internal inputs including cybersecurity standards of the enterprise and guidelines that are specific to the one or more assets of the enterprise,
     monitor, in real-time, changes that occur to the OSCSCBs, the VHDs, the information from the exploitation and vulnerability public databases, the cybersecurity standards of the enterprise, and the guidelines that are specific to the one or more assets of the enterprise;
     identify the collected external and internal inputs impacted by the changes;
     update, in real-time and based on the changes, the collected external and internal inputs;
     consolidate the collected external and internal inputs into an up-to-date feed, and
     apply, to the up-to-date feed, a supervised decision tree machine learning (ML) model to generate a mapping of cybersecurity configuration baseline (CSCB) controls to the one or more assets in the enterprise.

10. The system of claim 9, wherein the ML model identifies a criticality of each of the one or more assets, checks a history of vulnerabilities, and identifies relevant controls from external and internal sources.

11. The system of claim 9, wherein the mapping is based on a severity and a criticality in a network associated with the one or more assets.

12. The system of claim 9, wherein the OSCSCBs are obtained from one or more of the Center of Information Security (CIS) Benchmarks or the US Department of Defense Security Technical Implementation Guides (STIGs).

13. The system of claim 9, wherein the mapping identifies one or more of:
   an open source cybersecurity configuration baseline;
   vendor hardening documentation;
   high-level cybersecurity standards; and
   system-specific guidelines.

14. The system of claim 9, wherein the centralized cybersecurity standards manager is further operable to maintain an inventory of different asset types in the enterprise that require a CSCB.

15. The system of claim 14, wherein the centralized cybersecurity standards manager is further operable to identity relevant standards for each of the different asset types in the enterprise.

* * * * *